Nov. 8, 1938.   J. B. FRIEDMAN   2,135,808
CONFECTION
Filed April 27, 1936

INVENTOR
Joseph B. Friedman

Patented Nov. 8, 1938

2,135,808

UNITED STATES PATENT OFFICE 2,135,808

CONFECTION

Joseph Bernard Friedman, San Francisco, Calif.

Application April 27, 1936, Serial No. 76,590

3 Claims. (Cl. 99—137)

My invention relates to frozen confections and particularly to the type wherein a cake of ice cream is dispensed in the form of a portable ice cream cone to be held in the hand; and more particularly wherein this cake of ice cream is formed with a recess or cavity therein for the purpose of adding an edible substance such as a syrup, crushed fruits, jam, jelly, or the like, of different flavors. In this application the title "flavor" will designate any such substance. A device to form such a recess was described in Patent No. 1,857,685, Serial No. 439,048 issued to myself May 10, 1932.

In this type of confection, the liquidity and higher temperature of the flavor disintegrate the walls of the recess and destroy its function as a container, causing dripping of liquefied and melted ice cream, which makes its portability difficult. Also affecting the utility of this recess as a container is the fact that its walls and rim have little structural strength, and are quickly distorted and collapsed by the actions of the consumer's mouth during the process of consumption, thus forcing out and spilling the flavor. In an ice cream cone of the usual and convenient proportions, the quantity of flavor that can be used is limited to the size of the recess, which must be kept comparatively small to prevent too great a sacrifice in the quantity of ice cream served. Because of a combination of these disadvantages, the recess is soon gone and the entire flavor of necessity consumed at the beginning of the process of consumption, leaving the largest part of the confection without flavoring.

It is therefore an object of this invention to provide a new and improved article of confection with an edible receptacle for flavor which insulates the flavor from and prevents its contact with the ice cream; and which has sufficient structural strength to preserve its function as a container.

Another object of this invention is to provide means in a new confection of the type described, for containing a larger quantity of flavor without a proportionate reduction in the quantity of ice cream.

Another object of this invention is to provide a new article of confection of the character set forth, wherein some portion of the flavor remains during the whole period of consumption.

A further object is to provide a so-called ice cream "sundae" in readily portable form.

A still further object is to provide methods of making the article of confection described.

Other objects, advantages and features of my invention may appear from the accompanying drawing, the following description and appended claims.

In the drawing Fig. 1 is a partly broken and partly sectional front elevation of a preferred form of an ice cream confection made in accordance with my invention.

Figure 1:
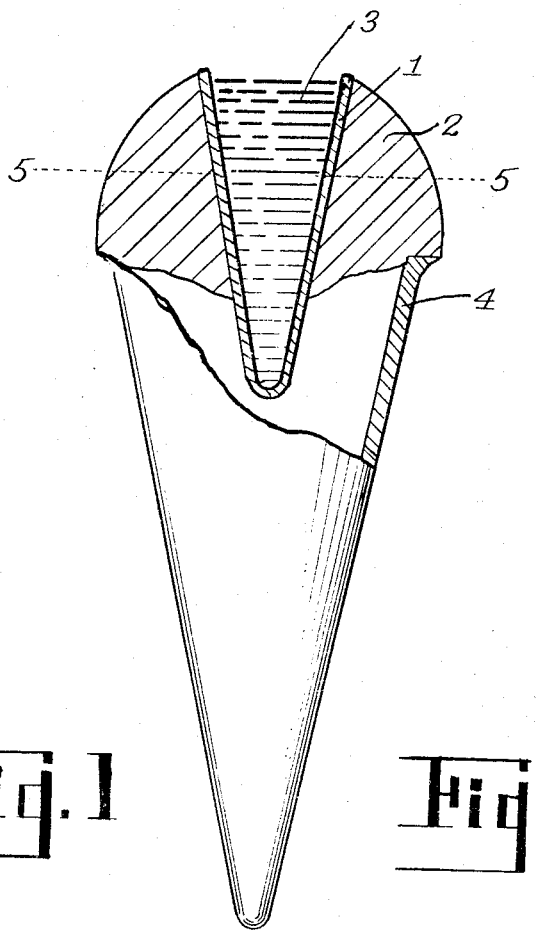

Referring to the drawing:

The numeral 4 is used to designate an edible holder consisting of a hollow substantially cone shaped pastry shell such as is well known in the art. This shell 4 supports at its upper open end a cake of ice cream 2.

Inserted into this cake of ice cream is an edible receptacle 1 such as a hollow substantially cone shaped pastry shell, apex downward.

A flavor 3 is contained in the receptacle 1.

Figure 3:
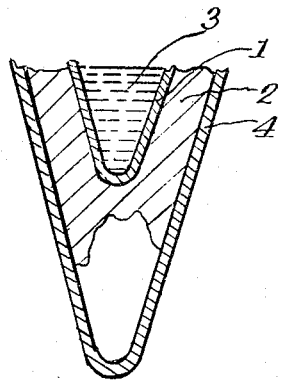
Fig. 3 is an enlarged vertical section of the lower portion of the confection shown in Fig. 1 remaining, after the upper portion has been consumed.
Figure 2:
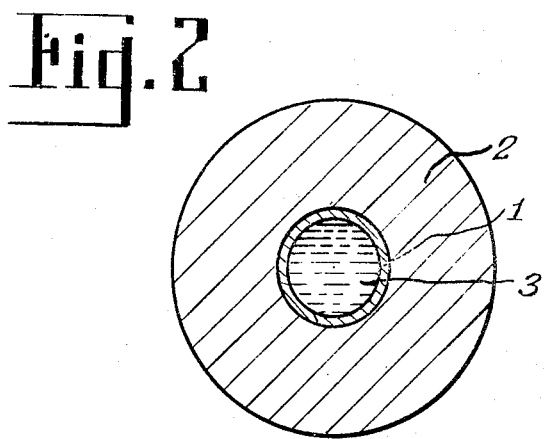
Fig. 2 is a transverse sectional view taken on a line 5—5 of Fig. 1.

In Fig. 3 is illustrated what occurs after a portion of the confection is consumed. As the cone is being consumed, the ice cream slowly descends due to its softening and to the downward pushing impulses given it by the mouth actions in the process of consumption. As it descends it carries with it the flavor containing receptacle 1, this receptacle being shaped substantially similar to the form of shell 4. In this manner some portion of the flavor may remain up to the complete consumption of the confection.

The receptacle 1 is preferably made of material similar to shell 4, namely, a baked pastry shell such as is well-known in the art. This material will hold a liquid for a period considerably longer than necessary for the purpose described. Its rim is readily nibbled at during consumption, small parts being eaten away, releasing portions of the flavor to be progressively consumed with the ice cream. It is obvious that the receptacle acts as a heat-insulating barrier between the frozen material the flavor having a higher temperature, and thus prevents premature mixing of ice cream and flavor. Other edible materials such, for example, as chocolate, can however be used, as a receptacle.

The whole of receptacle 1, in the preferred form shown in the drawing, is not embodied in the confines of the ice cream cake 2, the lower portion projecting through 2 and into the unoccupied space in shell 4. By increasing the size of this lower portion, which in fact may be extended any distance down to the closed apex of shell 4, the quantity of flavor may be increased without affecting the quantity of ice cream.

In making this confection, a preferred method is to form a cake of ice cream with a recess therein, from a freezer can, by means of a scoop such as for example is described in my aforementioned Patent No. 1,857,685, placing this cake in the open end of a pastry cone 4, inserting an edible receptacle 1, and filling said receptacle with a flavor.

Another method consists in placing an edible receptacle over the protuberance in the scoop then filling the scoop with ice cream. When the latter is released from the scoop the receptacle is already contained therein.

Still another method consists in placing a cake of ice cream in an edible holder, carving a recess therein and inserting the receptacle.

When the ice cream is served very soft the method may consist in placing a cake of ice cream in an edible holder, then inserting the receptacle, without the necessity of first forming a recess in the ice cream.

Another method consists in pouring ice cream into a mold of any desired shape, inserting an edible receptacle while the ice cream is soft, then hardening the ice cream, supporting same in a holder, and placing a flavor in the receptacle.

The shells 4 and 1, though shown herein as conical, may be of other desirable shapes.

While I use the term "ice cream" herein and in the claims, this is for convenience as a title only, and no limitation is to be implied thereby, as any frozen confection, such as ices, ice milk or sherbets, can of course be used.

Though I have herein described a preferred form of my invention, modifications thereof may be devised without departing from the spirit thereof, and it is to be understood that such modifications come within the scope of this invention.

What I claim is:

1. In a confection adapted to be eaten from the hand and comprising frozen material such as ice-cream and a liquid flavoring, means for retaining a portion of both frozen and liquid constituents until the confection is consumed and comprising a pair of edible containers of different sizes, the frozen material being supported by the larger of said containers and supporting the smaller of said containers therein and the liquid being held within said smaller container.

2. In a confection adapted to be eaten from the hand and comprising frozen material such as ice-cream and a liquid flavoring, a smaller conical container of edible material holding said liquid, and a larger conical container of similar material supporting said frozen material at the top thereof, said frozen material in turn forming a zone of support for the upper portion of said smaller container.

3. A confection comprising a pair of separate edible containers of different sizes, a mass of frozen confection supported by the larger container and surrounding the smaller container, and an unfrozen flavoring material within the smaller container.

JOSEPH BERNARD FRIEDMAN.